US012625945B2

(12) United States Patent
Farivar et al.

(10) Patent No.: US 12,625,945 B2
(45) Date of Patent: *May 12, 2026

(54) PASSWORD SECURITY WARNING SYSTEM

(71) Applicant: Capital One Services, LLC, McLean, VA (US)

(72) Inventors: Reza Farivar, Champaign, IL (US); Anh Truong, Champaign, IL (US); Vincent Pham, Champaign, IL (US); Austin Grant Walters, Savoy, IL (US); Galen Rafferty, Mahomet, IL (US); Jeremy Edward Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,315

(22) Filed: May 22, 2023

(65) Prior Publication Data
US 2023/0367868 A1     Nov. 16, 2023

Related U.S. Application Data

(63) Continuation of application No. 17/153,335, filed on Jan. 20, 2021, now Pat. No. 11,693,949, which is a continuation of application No. 16/549,391, filed on Aug. 23, 2019, now Pat. No. 10,909,235.

(51) Int. Cl.
| | |
|---|---|
| *G06F 21/00* | (2013.01) |
| *G06F 21/46* | (2013.01) |
| *G06N 3/04* | (2023.01) |
| *G06N 3/08* | (2023.01) |

(52) U.S. Cl.
CPC ............... *G06F 21/46* (2013.01); *G06N 3/04* (2013.01); *G06N 3/08* (2013.01)

(58) Field of Classification Search
CPC .. G06F 21/46; G06N 3/04; G06N 3/08; H04L 63/102
See application file for complete search history.

(56) References Cited

U.S. PATENT DOCUMENTS

| | | | | |
|---|---|---|---|---|
| 2009/0133120 A1* | 5/2009 | Cannizzaro | ............. | G06F 21/46 726/18 |
| 2009/0150677 A1* | 6/2009 | Vedula | .................... | G06F 21/46 726/1 |

(Continued)

FOREIGN PATENT DOCUMENTS

| | | | |
|---|---|---|---|
| CN | 108763920 A | * | 11/2018 |

OTHER PUBLICATIONS

Knabl, Georg. Thesis "Machine Learning-driven Password Lists". DOI: 10.13140/RG.2.2.33677.38883. May 2018 (Year: 2018).*
Machine Translation of CN-108763920-A (Year: 2018).*

*Primary Examiner* — Yogesh Paliwal
(74) *Attorney, Agent, or Firm* — KDW Firm PLLC

(57)     ABSTRACT

Various embodiments are directed to a password security warning system. An artificial neural network or other types of models may be used to determine whether a password that is created, input, or proposed by a user via an interface includes one or more predictable or typical transformations or combinations of characters derived from user-specific information. Based on the determination, a warning may be provided to the user.

20 Claims, 8 Drawing Sheets

(56) References Cited

U.S. PATENT DOCUMENTS

| | | | | |
|---|---|---|---|---|
| 2012/0110668 | A1* | 5/2012 | Schechter | G06F 21/46 |
| | | | | 726/25 |
| 2017/0155675 | A1* | 6/2017 | Howe | H04L 63/1425 |
| 2018/0309721 | A1* | 10/2018 | Ashley | H04L 63/06 |
| 2019/0121953 | A1* | 4/2019 | Chari | G06F 21/35 |

* cited by examiner

_TYPICAL OR PREDICTABLE CHARACTER TRANSFORMATIONS_

| _LETTER_ | _SPECIAL CHARACTER REPLACEMENT_ |
|----------|----------------------------------|
| _a_ | _@_ |
| _b_ | _6_ |
| _i_ | _1_   _!_ |
| _o_ | _0_ |
| _l_ | _1_   _!_ |
| _e_ | _3_ |
| _s_ | _$_ |

202

_TYPICAL OR PREDICTABLE CHARACTER COMBINATIONS_

_User Name + User Birthdate_

_Family Member Name + User Name_

_Family Member Birthdate + User Birthdate_

_User City of Birth + User Name_

_User Cell Number + User Name_

204

_BLACKLISTED PASSWORDS_

_Pa$$word_

_12345_

_ThisIsMyPassWord_

_wordPass_

_2468_

206

_FIG. 2_

400

306

$@RAHDO35595
@R@_12345b789
$@RAHJANEDO3ROE
XYZROCKS!
5552466789FLUFFY
$@RAHJ@NEDOEANDJOHNDOE
H!KE@LLDAY
TROP!C@LISL@NDLIVING
· · · ·
CENTRAL&MIDWESTERN

402

PW1:  $@RAHDO35595
PW2:  AR@!2345b789
PW3:  XYZROCKSALLTHETIME!
PW4:  FLUFFYJOHNDO3*
PW5:  H!KE@LLDAY

100%MATCH
75%MATCH
30%MATCH
43%MATCH
28%MATCH
100%MATCH

500

_600_

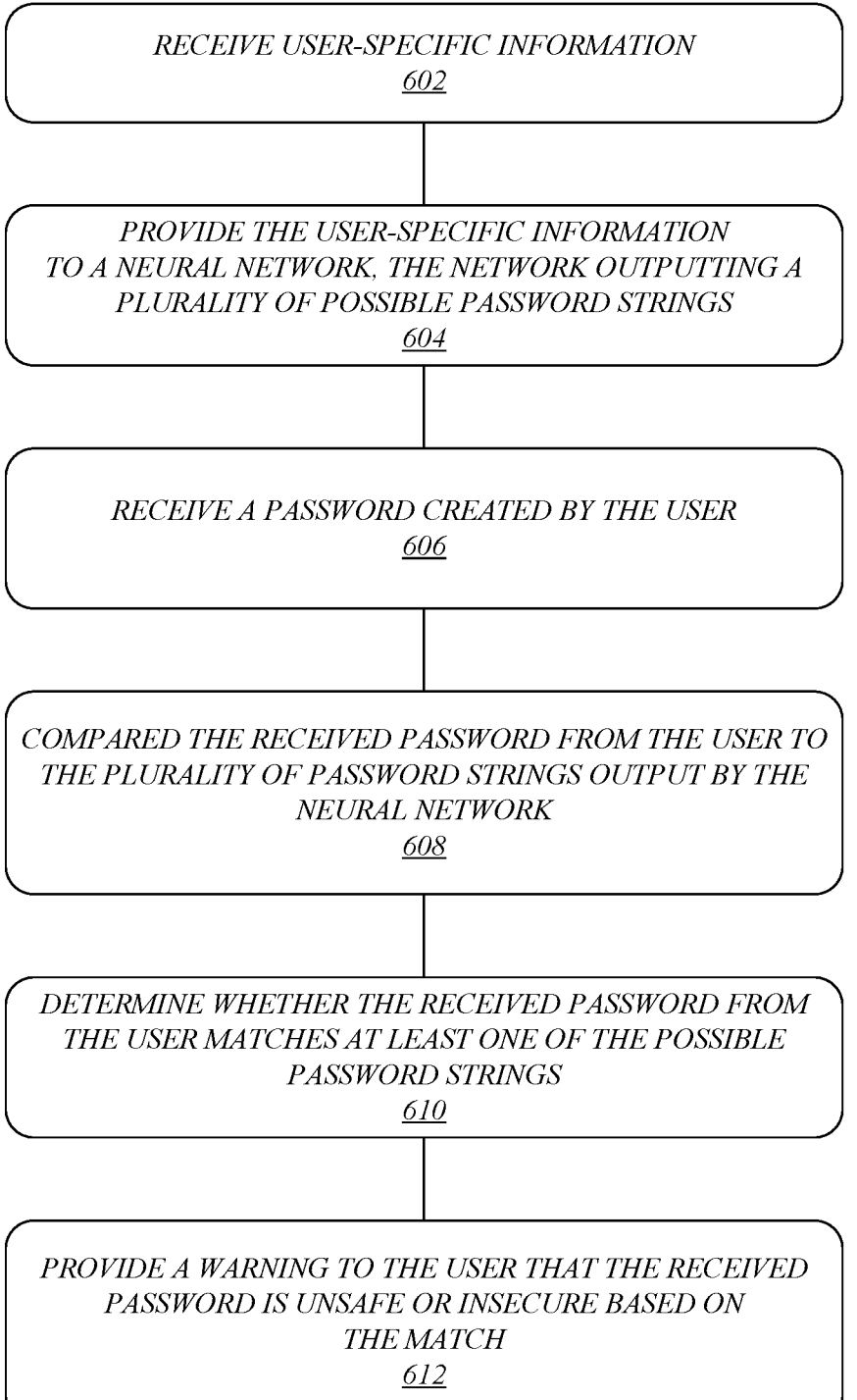

RECEIVE USER-SPECIFIC INFORMATION
_602_

PROVIDE THE USER-SPECIFIC INFORMATION
TO A NEURAL NETWORK, THE NETWORK OUTPUTTING A
PLURALITY OF POSSIBLE PASSWORD STRINGS
_604_

RECEIVE A PASSWORD CREATED BY THE USER
_606_

COMPARED THE RECEIVED PASSWORD FROM THE USER TO
THE PLURALITY OF PASSWORD STRINGS OUTPUT BY THE
NEURAL NETWORK
_608_

DETERMINE WHETHER THE RECEIVED PASSWORD FROM
THE USER MATCHES AT LEAST ONE OF THE POSSIBLE
PASSWORD STRINGS
_610_

PROVIDE A WARNING TO THE USER THAT THE RECEIVED
PASSWORD IS UNSAFE OR INSECURE BASED ON
THE MATCH
_612_

_FIG. 6_

*800*

PASSWORD SECURITY WARNING SYSTEM

RELATED APPLICATIONS

This application is a continuation of U.S. patent application Ser. No. 17/153,335 filed on Jan. 20, 2021, which is a continuation of U.S. patent application Ser. No. 16/549,391, titled "PASSWORD SECURITY WARNING SYSTEM" filed on Aug. 23, 2019. The contents of the aforementioned applications are incorporated herein by reference in their entirety.

BACKGROUND

Password strength may be a measure of the effectiveness of a password against guessing or brute-force attacks. Generally, the strength of a password is a function of length, complexity, and unpredictability.

To increase password strength, many password acceptance systems now require that users to incorporate special characters, e.g., @, in their passwords. As a result, many users create passwords having character transformations that are relatively simple and easy to guess. For example, replacing the letter "a" with special character "@." In addition, users tend to base passwords on a word, a combination of words, and phrases that are personal and easy to guess for them, such as using a child's name, a birth date, social security number, etc.

Common password transformations and overall lack of user creativity make it easy for fraudsters to guess the passwords and gain access to associated accounts. Accordingly, there is a need for a password security warning system to at least warn a user when a password that the user has created is easy to guess.

SUMMARY

Various embodiments are directed to a password security warning system. An artificial neural network, or other types of models, may be used to determine whether a password that is created, input, or proposed by a user via an interface includes one or more predictable or typical transformations or combinations of characters derived from user-specific information. Based on the determination, a warning may be provided to the user, such as a notification indicating that the password is weak or unsafe. In some examples, the password may be prohibited from use when it has been determined that the password has been previously blacklisted or identified as being involved in a security breach.

BRIEF DESCRIPTION OF THE DRAWINGS

FIG. 2 illustrate example character transformations and combinations and example blacklisted passwords in accordance with one or more embodiments.

FIG. 6 illustrates an example flow diagram in accordance with one or more embodiments.

DETAILED DESCRIPTION

Figure 1:
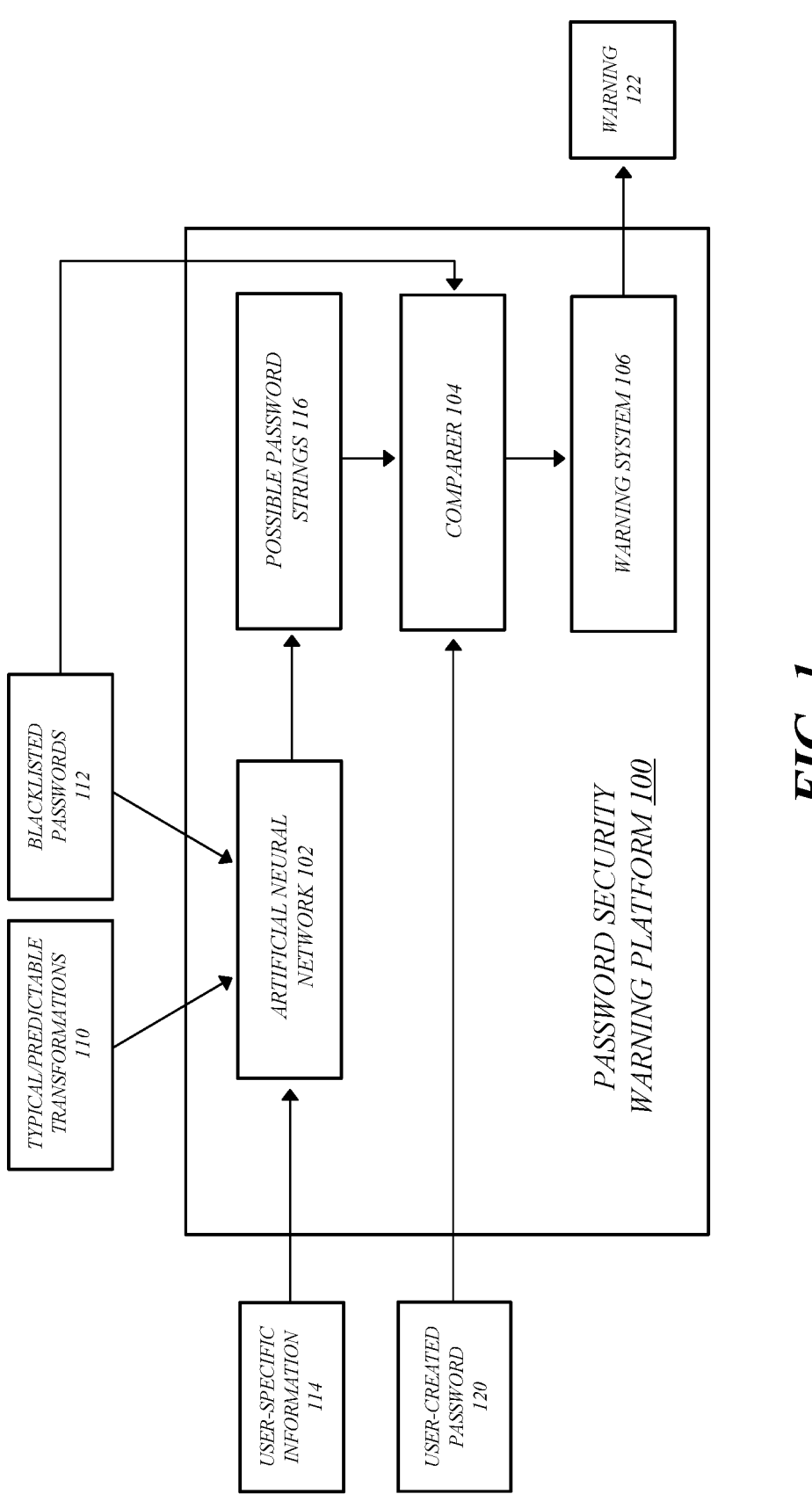
FIG. 1 illustrates an example password security warning platform in accordance with one or more embodiments.

Various embodiments are generally directed to a password security warning system for at least determining that a user-created password contains typical, predictable, or common transformations and warning a user of such password vulnerability. In examples, an artificial neural network may be trained using typical or predictable transformations commonly applied to passwords. For instance, a typical or predictable transformation may be replacing the letter "a" in a password string with special character "@" as will be further described below. Moreover, the artificial neural network may be trained using typical or predictable combinations of personal information commonly found in passwords, such as combining a birthdate and a portion of a name of the user, and further, may also be trained with a set of blacklisted passwords (e.g., commonly cracked or compromised passwords). The blacklisted passwords may be provided by the service provider, such as a financial company, and thus, the blacklisted passwords may be different across different types of service providers.

Various types of information specific to a user may be input or fed into the trained artificial neural network. For example, user-specific information may include the user's first, middle, last names, the user's nickname, a birthdate, a social security number, a home address, a work address, telephone numbers (e.g., work, home, mobile), spousal information, maiden name of user's mother, etc., all of which may be directly provided by the user, for example, during an application process.

Further, publicly available user-specific information may also be input or fed into the trained artificial neural network, which may include the name of the user's pet, a hobby that the user enjoys, information related to the user's profession, education history of the user (e.g., high school, college or university, graduate school), the user's favorite vacation destination, etc. The publicly available information may be found by way of an Internet search, for instance, on the user's social media account, the user's professional networking profile, blog(s) managed by the user, blog posts written by the user, an online dating profile of the user, a public article written by the user, an image of the user, etc.

According to embodiments, the trained artificial neural network may take all of the input user-specific information, perform processing thereon, and output a plurality of possible password strings, which may include typical, predictable, or common transformations, variations, combinations, and otherwise any suitable modification to the one or more characters of the password strings. In examples, when the user creates a new password, that password is compared against the plurality of possible password strings generated by the artificial neural network. The comparison process may be performed in real-time or substantially real-time, e.g., when the user is creating the password. When a match between the created password and one or more of the possible password strings, a warning is provided to the user indicating that the password the user is attempting to create is easy to guess.

In addition to using the blacklisted passwords to train the artificial neural network, as described above, the user-created password may also be compared against the blacklisted passwords. If the user-created password matches or closely resembles one or more of the blacklisted passwords, then the system may restrict the user from using that password, or at the very least, provide a warning to the user.

In further embodiments, a threshold matching technique may be employed. In at least that regard, a direct match between a possible password string generated by the neural network and the user-provided or proposed password is not required. For example, when the user-created password matches one or more of the possible password strings output by the artificial neural network up to a predetermined threshold value, e.g., 95%, then it will be considered a positive match and trigger a warning, which ensures protection against close variations of the plurality of possible password strings.

In embodiments, the warning may be in the form of a warning message displayed to the user via an interface. For example, the warning message may read, "This password can easily be guessed. Please try a different password." The warning may not be limited to text, but may also include auditory warnings, visual warnings (e.g., color-coded warnings), and the like.

In one example of a previous solution, a password strength meter is used to gauge how strong (or weak) a password is based on password length and complexity. However, gauging merely length and complexity does not account for the predictability or the "guessability" of the password when used in the real world. The embodiments and examples described herein overcome the problems existing in previous solutions by using and training an artificial neural network and by applying machine learning to effectively mimic or emulate a fraudster or the like and generate numerous possible passwords based on typical, predictable, or common transformations, arrangements, combinations, modifications, etc. applied to private or publicly available user-specific information. In some cases, based on its training and the quality of the generated possible passwords, the artificial neural network may be able to make better "guesses" than fraudsters, etc. themselves. Thus, by comparing user-created or user-entered passwords to these possible passwords generated by the artificial neural network, the user (e.g., the consumer) can be adequately protected.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example password security warning platform 100 according to embodiments. As shown, the password security warning platform 100 may include at least an artificial neural network 102 (or a mechanism to access or communicate with an artificial neural network 102 such as an application programming interface (API) or any other suitable interface), a comparer 104, and a warning system 106. The artificial neural network may be trained using typical or common transformations 110 of password characters and may also be trained using blacklisted passwords 112. It may be understood that the artificial neural network may further be trained using typical, predictable, or common combinations of password characters and other suitable characteristics found in passwords that are commonly cracked. As will be further described below, typical or common transformations of password characters include replacing certain letter with similar-looking special characters, e.g., "a" and "@" or "s" and "$" etc. The term "special characters" may be understood to be interpreted broadly and may include numbers or any other typable characters.

User-specific information 114 may be input to the artificial neural network 102 to generate one or more possible password strings 116 based on the user-specific information 114. The user-specific information 114 may be any information, either private or public, that relates to a user in any way. For example, it may be information provided by the user as part of an application process, e.g., application for a loan, financing, mortgage, etc., as part of creating or opening an online account, or the like. Thus, information such as the user's full legal name, nickname, birthdate, social security number, addresses, phone numbers, spousal information, names of family members, and/or income information may be user-specific information. In other examples, information related to the user may be available in the public domain, e.g., the Internet, and may be collected or retrieved to be input to the artificial neural network 102. For instance, publicly available information may be found in the user's social media account(s), professional networking profile, professional webpage, blog(s), dating profile(s), public articles, images, etc.

As further shown in FIG. 1, the artificial neural network 102 may receive the user-specific information 114, perform processing, and output a list of possible password strings 116. For example, the possible password strings 116 may include passwords formed by combining one or more words or characters provided in the user-specific information with typical or predictable transformations, arrangements, combinations, modifications, and so forth applied thereto. In at least this way, the artificial neural network 102 may be guessing or attempting to guess all possible ways a user may be able to use the user-specific information 114 to create predictable passwords.

When the user creates a password, which may be referred to as a user-created password 120 or a user-proposed password, in real-time or substantially real-time, it may be input to a comparer 104. In examples, the user-created or user-proposed password may be received via a login interface, e.g., when the user is asked to create or reset a password (which can be user initiated). Moreover, it may be understood, that the password provided or proposed by the user may be part of a proactive process in which the user is prompted or requested to change an existing password that is weak, has been identified (or a variation thereof has been identified) as being a blacklisted password, contains aspects or patterns identified in the password as being related to a security breach, etc.

As shown, the comparer 104 may compare the user-created password 120 with all the possible password strings 116 that were generated by the artificial neural network 102. Moreover, the user-created password 120 may be compared against all the blacklisted passwords 112 to ensure that there are no one-to-one matches of passwords that are restricted from use. When the user-created password 120 matches one or more of the possible password strings either identically or up to a threshold percentage, the warning system 106 outputs a warning 122. When the user-created password 120 matches one or more of the blacklisted passwords 112, the warning system 106 may output a message indicating that the user-created password 120 is restricted from use.

It may be understood that the illustrated password security warning platform 100 and the components therein in FIG. 1 have been simplified for ease of explanation and are non-limiting examples. Moreover, it may be understood that the artificial neural network 102 may be any suitable artificial neural network, such as a feedforward neural network, a radial bias function neural network, a Kohonen self-organizing neural network, a recurrent neural network (RNN), a convolutional neural network, or a modular neural network. Furthermore, the password security warning platform and the components may function in other various ways. For example, in an alternative embodiment, the neural network (or a different type of model) may directly receive the user-proposed password and may determine a strength rating (as opposed to comparing the user-proposed password to a list of possible password strings). The strength rating may still be based on the commonly applied, typical, or predictable transformations, combinations, or variations to characters, as described above. Other ways to determine weak passwords may include, for example: fuzzy matching, which involves using a distance (e.g., Levenshtein distance) to calculate a distance between an input password with a set of blacklisted passwords, and if the distance is less than a specific threshold, a warning is provided; machine learning models, which involves extracting various features from blacklisted passwords (e.g., digits, letters, special characters, birthday, etc.) and training a classifier (e.g., random forest, logistic regression, decision tree, etc.) to score an input password as likely a weak password; and sequence-based model (e.g., RNN, LSTM), which may be a model that learns features at the character level and the sequential correlations among the characters and predict the likelihood of how weak an input password may be.

FIG. 2 illustrates example transformations 202, example character combinations 204, and a list of blacklisted passwords 206 according to embodiments. As described above, the transformations 202, the character combinations 204, and the blacklisted passwords 206 may be used as datasets to train an artificial neural network.

As shown, typical or predictable character transformations 202 involve transforming or replacing a specific letter or character with a "special character" in a typical or predictable way. For example, the letter "a" (or "A") may be replaced with the special character or symbol "@". The term "special character" may be understood to be interpreted broadly and may include any symbol, character, number, or any other typable character. In another example, the letter "b" (or "B") may be replaced with the number "6." In yet another example, the letter "i" (or "I") may be replaced with the number "1" or the symbol "!". In a further example, the letter "o" (or "O") may be replaced with the number "0". In another example, the letter "1" (or "L") may be again replaced with the number "1" or the symbol "!". Moreover, the letter "e" (or "E") may be replaced with the number "3" and the letter "s" (or "S") may also be replaced with the symbol "$". It may be understood that these examples are merely illustrative and that many more types of letters may be replaced with many different special characters.

As further shown, typical or predictable character combinations 204 involve combining certain words or characters in a typical or predictable way. By way of example, a user's name and user's birthdate may be combined to form password. In another example, a name of the user's family member (e.g., wife, husband, son, daughter, mother, father, etc.) and the user's name may be combined. Moreover, a birthdate of the user's family member and the user's birthdate may be combined. In further examples, the user's city of birth and the user's name may be combined, and also, the user's cellular phone number and the user's name may be combined. It may be understood that the possible typical or predictable combinations of characters or words are vast and numerous and not limited to the ones illustrated in FIG. 2.

As further shown, the end-user may select icon 228 on screen 204, which may result in screen 210, or may select icon 230, which may result in screen 212. Moreover, the end-user may select icon 234 on screen 206, which causes screen 214 to be displayed. And icon 236 may be selected on screen 208, which pulls up screen 216. Thus, screens 210 and 212 share linking relationships with screen 204, screen 214 shares a linking relationship with screen 206, and screen 216 shares a linking relationship with screen 208. The multiple layers of the linking relationships are depicted by layers 250, 260, and 270.

Moreover, the list of blacklisted passwords 206 may be maintained, for example, by an entity, such as a financial company. When users report to the entity that their accounts have been compromised, the passwords associated with their accounts may be added to the list. It may be understood that the list of the blacklisted passwords 206 may be an evolving and growing list. As shown, passwords like "Pa$$word," "12345," "ThisIsMyPassWord," "wordPass," 2468" may be blacklisted. In examples, blacklisted passwords may be restricted from use, as will be further described below.

As described above, the character transformations 202, the character combinations 204, and the blacklisted passwords 206 may all be used to train the artificial neural network. It may be understood that the more variations of transformations, combinations, and blacklisted passwords are fed into the artificial neural network, the "smarter" the artificial neural network may become. Moreover, it may be understood that the typical or predictable character transformation and/or combinations, as described above, may be specific to the user or general to the population. For example, if a specific user adds the same character at the end of all passwords, then this would be identified as a predictable password pattern for the user even though it may not be necessarily applicable for the general population of users.

Figure 3:
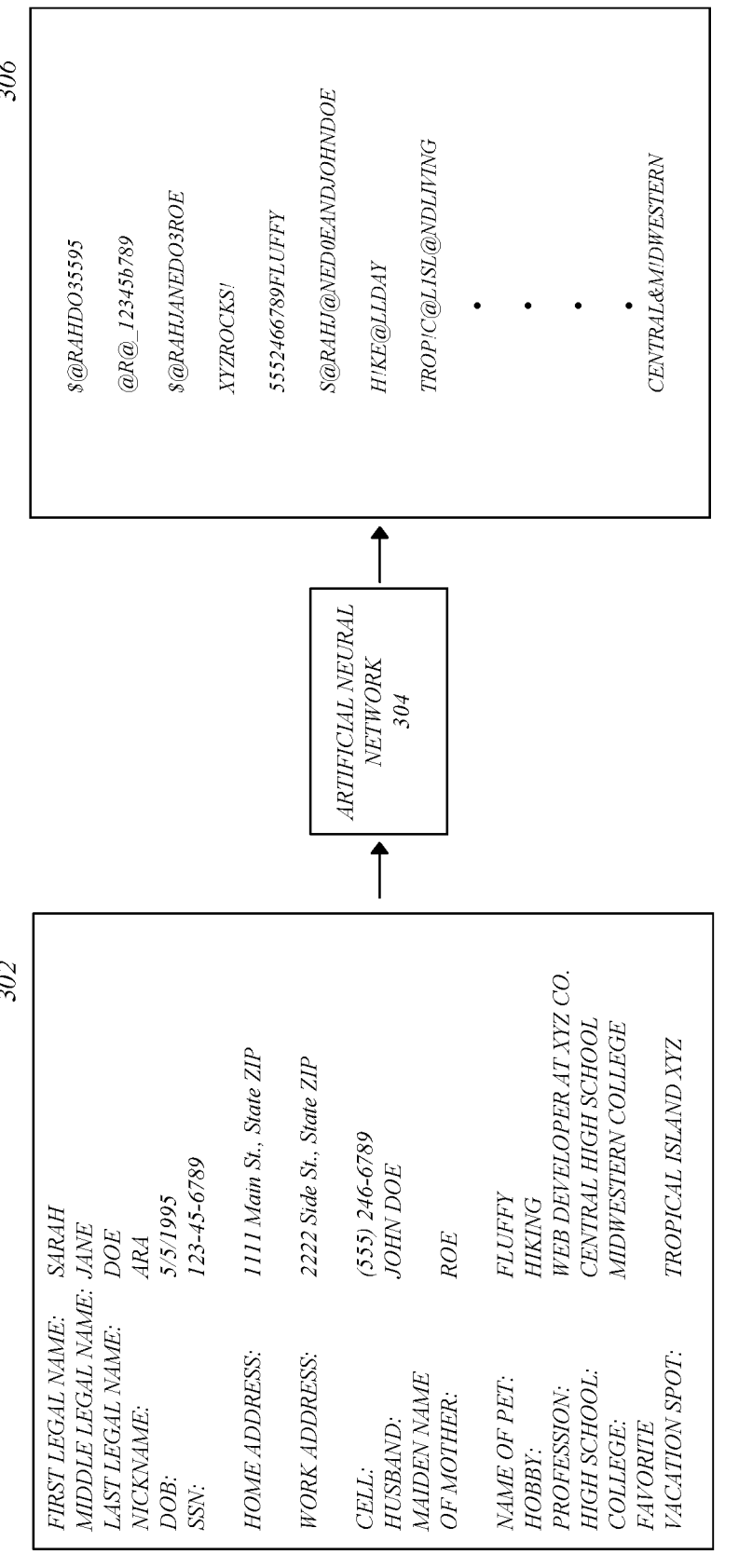
FIG. 3 illustrates an example output of an artificial neural network in accordance with one or more embodiments.

FIG. 3 illustrates an example output of an artificial neural network 304 according to embodiments. As shown, user-specific information 302 may be input to the artificial neural network 304, which may have been trained using data similar to the data illustrated in FIG. 2. For example, the user-specific information 302 may be provided to an entity, e.g., a financial company, by a user during an application process (e.g., for a loan, for a mortgage, etc.) or when signing up for an online account. Additionally, the user-specific information 302 may include publicly available information about the user, which may be acquired via an Internet search.

According to embodiments, the user-specific information 302 may include at least the user's full legal name (e.g., Sarah Jane Doe), the user's nickname ("Ara"), date of birth (May 5, 1995), social security number (e.g., 123-45-6789), home and work addresses, mobile phone number (555-246-6789), the name of the user's husband (e.g., John Doe), and the maiden name of the user's mother (e.g., Roe). Moreover, publicly available information included in the user-specific information 302 may include at least the name of the user's pet (e.g., Fluffy), the user's hobby (e.g., hiking), the user's profession (e.g., web developer at XYZ company), the user's education history (e.g., Central High School, Midwestern College), and favorite vacation destination (e.g., tropical island XYZ). The publicly available information may be acquired from the user's social media account(s), professional networking profile, the user's professional profile webpage, blog(s), the user's public online dating profile (s), public articles, and/or images of the user (and/or metadata therein).

The artificial neural network 304 receives the user-specific information 302, performs analysis, and outputs numerous possible password strings 306 that can be formed by transforming, combining, and/or arranging the characters in the user-specific information 302. In at least this regard, the artificial neural network may employ machine learning, artificial intelligence, etc. techniques to output all possible passwords that the user may create based on the user-specific information 302 in typical or predictable ways. Effectively, the artificial neural network is guessing or attempting to guess the easily guessable passwords before fraudsters do.

It may be understood that the artificial neural network may be any suitable type of neural network, such as a feedforward neural network, a radial bias function neural network, a Kohonen self-organizing neural network, a recurrent neural network (RNN), a convolutional neural network, or a modular neural network. Moreover, the artificial neural network may implement one or more machine learning, artificial intelligence, classification, etc. techniques, such as a logistic regression model, a decision tree model, a random forest model, a Bayes model, etc. based on a convolutional neural network (CNN) algorithm, a recurrent neural network (RNN) algorithm, or a hierarchical attention network (HAN) algorithm, and the like.

As illustrated, the artificial neural network 304 outputs numerous possible password strings 306 based on the input user-specific information 302. In one example password string, may be a combination of the user's first legal name and the user's birthdate. In addition to the typical or predicable combination, one or more typical or predicable transformations to the characters may be to replace the letter "s" with the "$" symbol, change the letter "a" with the "@" symbol, and replace the letter "e" with the number "3" thus producing the possible password string "$@RAHDO35595." In another example, a possible password string may be the combination of the user's mobile phone number and the name of the user's pet, which produces "5552466789FLUFFY." Other possible password strings may be output based on various combinations and/or transformations, as shown.

Figure 4:
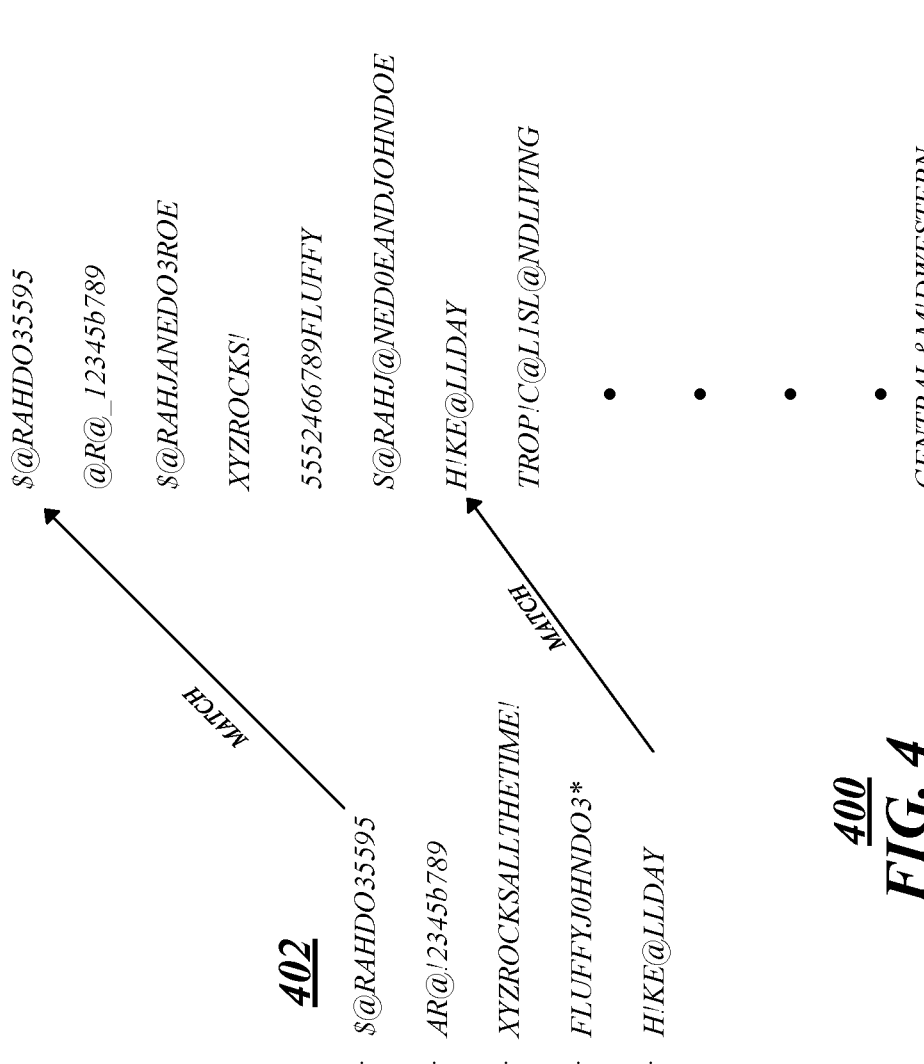
FIG. 4 illustrate example password security warnings in accordance with one or more embodiments.

FIG. 4 illustrate example password security warnings 400 according to embodiments. For ease of explanation, the possible password strings 306 discussed above with respect to FIG. 3 will be used to describe the example password security warnings 400. When signing up for a new online account or a mobile or web-based application, the user may be required to create a password. As shown, user-created passwords 402, PW1 to PW5 may be different possible passwords that the user may create.

For example, the user may enter the password string, PW1, "$@RAHDO35595" in a web or app interface as the desired password. A password security warning platform, e.g., the password security warning platform 100 of FIG. 1 described above, may compare this entered password with the numerous possible password strings 306 generated by the artificial neural network 304. The password security warning platform may determine that PW1 matches identically to one of the possible password strings 306, as shown. As a result, a warning interface 406 may be displayed to the user, which may recite a password security warning that the password the user has entered is easily guessable and susceptible to a security breach. The password security warning may be any suitable type of message, alert, etc., which may be audible, visual (e.g., color-coded), or the like. Thus, at least a goal of the password security warning message is to dissuade the user from using the created password. In some examples, the interface may also display an option for the user to ignore the warning message and proceed.

In another example, the user may enter the password string, PW5, "H!KE@LLDAY" into the web or app interface as the desired password. The password security warning platform may also compare this password with the plurality of possible password strings 306 and determine that the user-entered password identically matches one of the possible password strings 306, as illustrated. In one embodiment, a restriction interface 408 may display a message indicating that the user is restricted from creating or using the entered password. In examples, the password restriction may be based on numerous reasons, e.g., the entity may disallow one-to-one matched passwords, the password may be a blacklisted password, etc.

For PW2, PW3, and P4, the password security warning platform may determine that because identical matches do not exist, no warnings are generated, and thus, the user may be allowed to proceed to create the passwords. It may be understood that the comparison of a user-entered or user-created password to the possible password strings generated by the artificial neural network may be in real-time or substantially real-time (e.g., as the user types or finishes typing in the password, the password may be compared to the possible password strings simultaneously).

Figure 5:
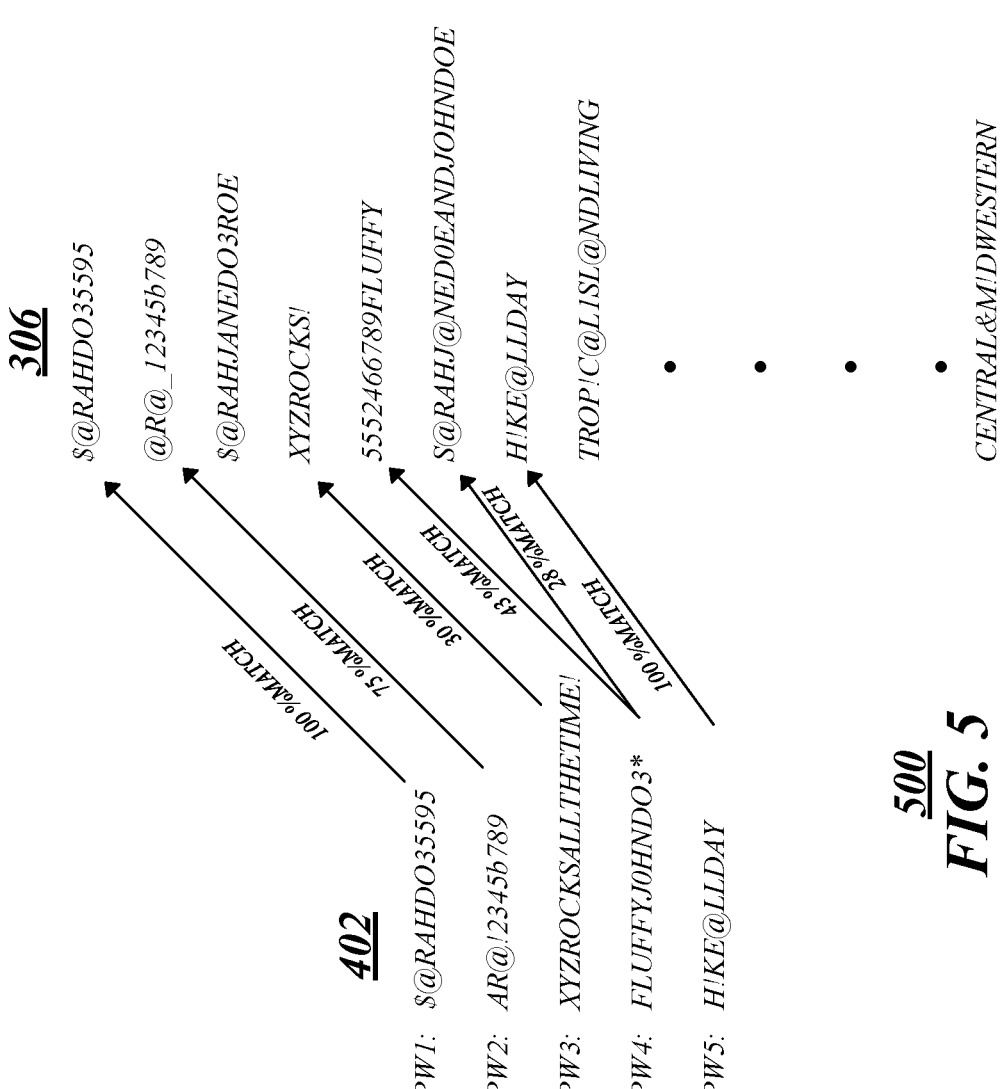
FIG. 5 illustrates example threshold matching in accordance with one or more embodiments.

FIG. 5 illustrates example threshold matching 500 according to embodiments. For ease of explanation, the user-created passwords 402 and the possible password strings 306 generated by the artificial neural network 304 will again be used to describe the features of threshold matching 500.

In examples, a password security warning platform may compare each and every password that the user creates to a list of all possible password strings generated by an artificial neural network and determine what percentage of those user-created passwords match the network-generated possible password strings. As shown, the platform may first determine which of the possible password strings 306 resemble or match PW1 to PW5. For instance, PW2 closely resembles the second listed possible password string. The platform may then determine a match percentage between the two passwords. For PW2, the match percentage may be 75 percent.

Moreover, the platform may determine that PW3 and the fourth listed possible password string may have a match percentage of 30 percent. In another example, the platform may determine that PW4 is similar to two different possible password strings 306—the fifth and sixth listed possible password strings, which have match percentages of 43 and 28 percent, respectively. As described above, PW 1 and PW 5 have match percentages of 100 percent.

According to embodiments, a predetermined threshold match or threshold match percentage may be set, which may be 75 percent, 80 percent, 95 percent, etc. When a match percentage meets or exceeds the predetermined threshold match, in one example, the match may be effectively be treated as a one-to-one, e.g., 100 percent, match and thus, appropriate steps may be taken, e.g., generate a warning message, restrict the user from using that password. In another example, if the match percentage is less than the predetermined threshold match, the user may be allowed to proceed with creating the password. In some instance, a warning message dissuading the user from using the password may still be displayed on the user interface even though the match percentage is less than the predetermined threshold match.

By way of example in FIG. 5, if the predetermined threshold match is set at 75 percent, then PW2 will be treated as a one-to-one match with the second listed possible password string. The platform may thus generate an appropriate warning message (or even restrict the user from using the password, as described above) when attempting to use PW2.

FIG. 6 illustrates an example flow diagram 600 according to one or more embodiments. The flow diagram 600 may be related to password security warning. It may be understood that the features associated with the illustrated blocks may be performed or executed by one or more computing devices and/or processing circuitry contained therein that can run, support, execute a password security warning platform, such as the one illustrated in FIG. 1.

At block 602, user-specific information is received. For example, a password security warning platform such as the one illustrated and described in FIG. 1 may receive the user-specific information. As described above, the user-specific information may be any information personal or private associated with a particular user, e.g., social security number, addresses, birthdate, phone numbers, spousal information, family information, work information, etc. In examples, the information may be provided by the user in an application when opening a banking account or the like.

At block 604, the user-specific information may be provided to an artificial neural network, which outputs numerous possible password strings that are formable based on the information provided by the user. As set forth above, the neural network may be trained using data sets that contain predictable transformations or variations of letters to characters, such as replacing the letter "a" with the symbol "@" etc. In further examples, the neural network may be trained using predictable or typical character combinations, such as combining a user's name and birthday or combining the name of the user's child and the name of the user's spouse, etc. It may be understood that the typical or predictable character transformation, combinations, patterns, etc. may be specific to the user or general to the global population. If, for example, a user utilizes a specific pattern in all of the user's passwords, then this pattern may be identified as a predictable password pattern for that user even though it may not be applicable to the global population of users.

At block 606, a password created, entered, or proposed by the user is received. As described above, in examples, the password may be received via a login interface on a mobile application or website. The user may initiate to create or reset a password, or in other examples, the password may be received as part of a process of proactively prompting or requesting the user for the password, e.g., when the user's existing password has been identified as weak, or has been compromised, or has been identified as being related to a security breach, etc.

At block 608, the user-created or user-proposed password is compared to the plurality of possible password strings provided by the neural network at block 604. And at block 610, when it has been determined that there has been a match, at block 612, a warning is provided to the user that the password proposed by the user is insecure or unsafe. It may be understood that the match is not required to be a direct one-to-one match. A threshold matching process or mechanism may be established to determine whether a threshold similarly level has been reached, which would still be considered a match, as described above. Moreover, in alternative examples, a password proposed by the user may be input into the neural network, which may determine a strength rating (as opposed to comparing the user-proposed password to a list of possible password strings). The strength rating may be based on the typical or predictable character transformations, combinations, variations, patterns, etc.

It may be understood that the blocks illustrated in FIG. 6 are not limited to any specific order. One or more of the blocks may be performed or executed simultaneously or near simultaneously.

Figure 7:
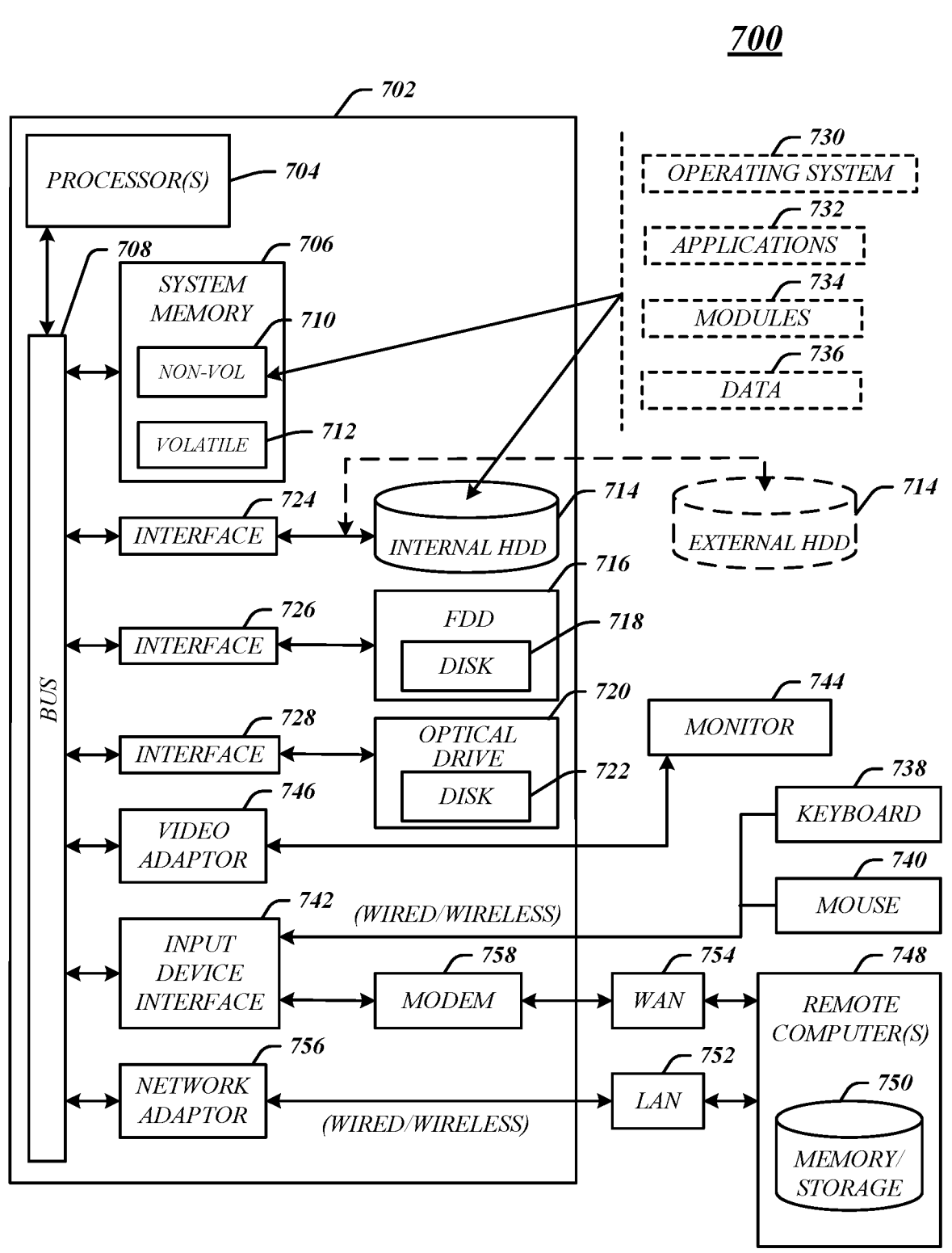
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. In examples, one or more computing devices and the processing circuitries thereof may be configured to at least run, execute, support, or provide the password security warning platform, e.g., password security warning platform 100, and related functionalities (via, for example, backed server computers) and/or the various applications, files, websites, etc. on the end-user side (via, for instance, mobile computers, smartphones, tablet computers, etc.).

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
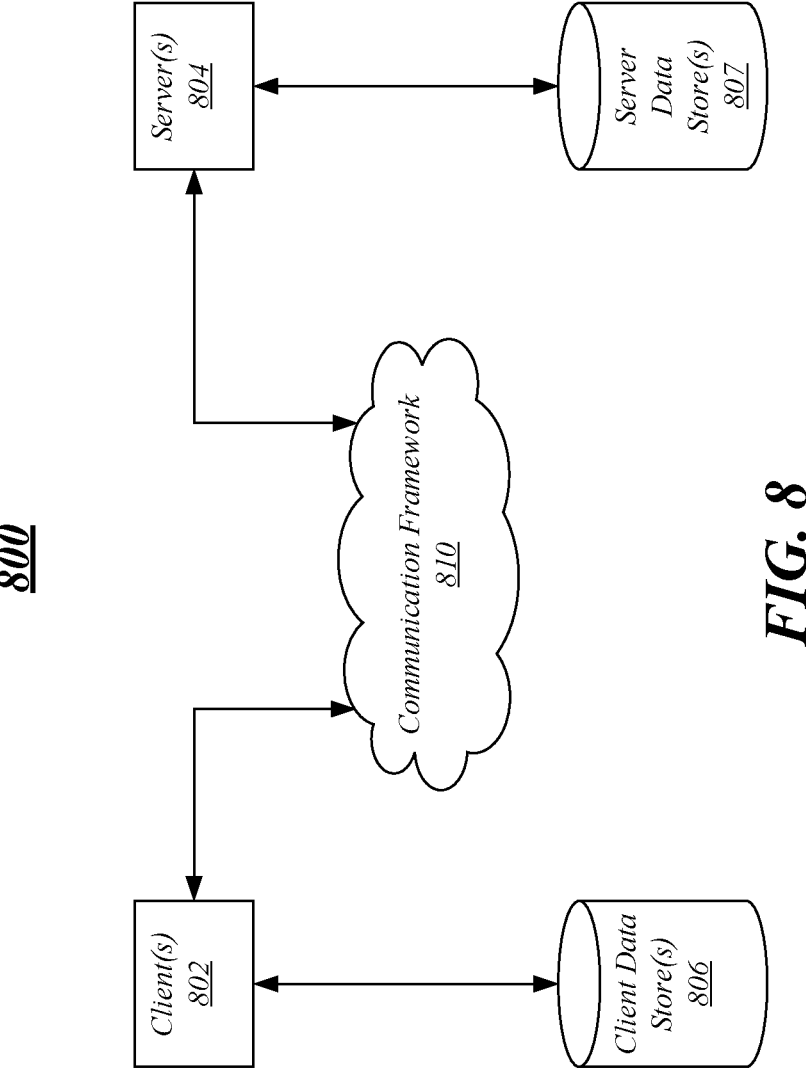
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least a first computing device connected to the network may be one or more server computers, which may be implemented as a back-end server or a cloud-computing server, which may run the password security warning platform described herein, e.g., password warning security platform 100, and perform all related functionalities. At least a second computing device connected to the network may be a user computing device, such as a mobile device (e.g., laptop, smartphone, tablet computer, etc.) or any other suitable computing device that belongs to the end-user.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
a memory storing instructions,
one or more processors operably coupled to the memory and configured to execute the instructions that, when executed by the one or more processors, cause the one or more processors to:
determine one or more patterns associated with a user, the one or more patterns comprising at least one of a user-specific pattern of passwords specific to a user, the user-specific pattern not general to a population of users or combinations of at least: first personal information and second personal information different from the first personal information typical or predictable in weak passwords;
process a plurality of lists of blacklisted passwords received from a plurality of service providers, each of the plurality of lists of blacklisted passwords being received from a corresponding service provider of the plurality of service providers, wherein at least one of the plurality of lists of blacklisted passwords is different than other lists of the plurality of lists of blacklisted passwords, wherein at least one of the plurality of service providers is a financial institution;
train a neural network based at least in part on: the user-specific pattern, a plurality of typical or predictable password transformations, the one or more patterns of the combinations of at least the first and second personal information and the plurality of lists of blacklisted passwords, the trained neural network configured to output a plurality of possible password strings unique to a user in response to user-specific information associated with the user provided to the neural network;
receive a password created by the user;
determine whether the password matches at least one possible password string of the plurality of possible password strings based on a threshold match;
provide a warning message that the password is unsafe or insecure in response to the password matching the at least one possible password string, wherein the one or more processors are further caused to:
allow the warning message to be bypassed and the password to be created in response to the threshold match being below a predetermined threshold.

2. The apparatus of claim 1, wherein the user-specific information is provided by the user and comprises one or more of the following: a legal first name, a legal middle name, a legal last name, a nickname, a date of birth, a social security number, a home address, a work address, a telephone number, spousal information, and/or a maiden name.

3. The apparatus of claim 1, wherein the instructions, when executed by the one or more processors, further cause the one or more processors to:

perform an Internet search on the user and provide one or more results of the Internet search to the neural network as the user-specific information, wherein the one or more results of the Internet search comprise information associated with the user from at least one of a social media account, a professional networking profile, a professional profile webpage, a blog, an online dating profile, a public article, or an image.

4. The apparatus of claim 1, wherein the plurality of typical or predictable password transformations comprises at least one replacement of a letter with an associated special character.

5. The apparatus of claim 1, wherein the plurality of possible password strings output by the neural network comprises at least one or more typical or predictable transformations of the user-specific information and one or more typical or predictable combinations of the user-specific information.

6. The apparatus of claim 1, wherein the user-specific pattern is determined based on an identification of a specific pattern used in previous passwords of the user.

7. The apparatus of claim 1, wherein the warning message is output to an interface; and wherein the one or more processors are further caused to:

receive at least one compromised password determined to have been cracked or compromised; and add the at least one compromised password to at least one of the plurality of lists of blacklisted passwords for updating the training of the neural network to include cracked and compromised passwords.

8. An apparatus comprising:

at least one memory storing instructions;

one or more processors, operably coupled to the at least one memory, operable to execute the instructions that, when executed by the one or more processors, cause the one or more processors to:

determine a user-specific pattern of passwords specific to a user, the user-specific pattern not general to a population of users;

process a plurality of lists of blacklisted passwords received from a plurality of service providers, each of the plurality of lists of blacklisted passwords being received from a corresponding service provider of the plurality of service providers, wherein at least one of the plurality of lists of blacklisted passwords is different than other lists of the plurality of lists of blacklisted passwords, wherein at least one of the plurality of service providers is a financial institution;

train a neural network based at least in part on the user-specific pattern and the plurality of lists of blacklisted passwords, the trained neural network configured to output a plurality of possible password strings unique to the user based, at least in part, on user-specific information associated with the user provided to the neural network;

receive a password created by the user;

determine whether the password matches at least one possible password string of the plurality of possible password strings based on a threshold match;

output a warning message to an interface indicating the password may be unsafe or insecure; and

allow the warning message to be bypassed and the password to be created in response to the threshold match being below a predetermined threshold.

9. The apparatus of claim 8, wherein the user-specific pattern is determined based on an identification of a specific pattern used in previous passwords of the user.

10. The apparatus of claim 8, the instructions, when executed by the one or more processors, further cause the one or more processors to:

receive at least one compromised password determined to have been cracked or compromised; and add the at least one compromised password to at least one of the plurality of lists of blacklisted passwords for updating training of the neural network to include cracked and compromised passwords.

11. The apparatus of claim 8, wherein the user-specific information is provided by the user and comprises one or more of the following: a legal first name, a legal middle name, a legal last name, a nickname, a date of birth, a social security number, a home address, a work address, a telephone number, spousal information, and/or a maiden name.

12. The apparatus of claim 8, wherein the instructions, when executed by the one or more processors, further cause the one or more processors to:

perform an Internet search on the user and provide one or more results of the Internet search to the neural network as the user-specific information, wherein the one or more results of the Internet search comprise information associated with the user from at least one of a social media account, a professional networking profile, a professional profile webpage, a blog, an online dating profile, a public article, or an image.

13. The apparatus of claim 8, wherein the plurality of possible password strings comprises at least one typical or predictable password transformation, the at least one typical or predictable password transformation comprising at least one replacement of a letter with an associated special character.

14. The apparatus of claim 8, wherein the plurality of possible password strings output by the neural network comprises at least one typical or predictable transformation of the user-specific information and at least one typical or predictable combination of the user-specific information.

15. A computer-implemented method, comprising, via at least one computing device:

determining a user-specific pattern of passwords specific to a user, the user-specific pattern not general to a population of users;

processing a plurality of lists of blacklisted passwords received from a plurality of service providers, each of the plurality of lists of blacklisted passwords being received from a corresponding service provider of the plurality of service providers, wherein at least one of the plurality of lists of blacklisted passwords is different than other lists of the plurality of lists of blacklisted passwords, wherein at least one of the plurality of service providers is a financial institution;

training a neural network based at least in part on the user-specific pattern and the plurality of lists of blacklisted passwords, the trained neural network configured to output a plurality of possible password strings unique to the user based, at least in part, on user-specific information associated with the user provided to the neural network;

receiving a password created by the user; and determining whether the password matches at least one possible password string of the plurality of possible password strings based on a threshold match;

wherein the method further comprises:

outputting a warning message to an interface indicating the password may be unsafe or insecure; and allowing the warning message to be bypassed and the password to be created in response to the threshold match being below a predetermined threshold.

16. The method of claim 15, wherein the user-specific pattern is determined based on an identification of a specific pattern used in previous passwords of the user.

17. The method of claim 15, further comprising:

receiving at least one compromised password determined to have been cracked or compromised; and adding the at least one compromised password to at least one of the plurality of lists of blacklisted passwords for updating training of the neural network to include cracked and compromised passwords.

18. The method of claim 15, further comprising:

performing an Internet search on the user and provide one or more results of the Internet search to the neural network as the user-specific information, wherein the one or more results of the Internet search comprise information associated with the user from at least one of a social media account, a professional networking profile, a professional profile webpage, a blog, an online dating profile, a public article, or an image.

19. The method of claim 15, wherein the plurality of possible password strings comprises at least one typical or predictable password transformation, the at least one typical or predictable password transformation comprising at least one replacement of a letter with an associated special character.

20. The method of claim 15, wherein the plurality of possible password strings output by the neural network comprises at least one typical or predictable transformation of the user-specific information and at least one typical or predictable combination of the user-specific information.

* * * * *